United States Patent [19]

Costarella, deceased et al.

[11] 3,902,405

[45] *Sept. 2, 1975

[54] RINGLESS PISTON

[76] Inventors: Nino F. Costarella, deceased, late of Milwaukee, Wis., by Marion A. Costarella, personal representative, 8929 W. Hadley St., Milwaukee, Wis. 53206

[ * ] Notice: The portion of the term of this patent subsequent to July 17, 1990, has been disclaimed.

[22] Filed: Mar. 19, 1973

[21] Appl. No.: 342,727

Related U.S. Application Data

[63] Continuation-in-part of Ser. No. 151,268, June 9, 1971, Pat. No. 3,745,890, and a continuation-in-part of Ser. No. 800,956, Feb. 20, 1969, abandoned.

[52] U.S. Cl. ............... 92/192; 92/243; 92/246; 92/249
[51] Int. Cl.² ............................................. F16J 1/04
[58] Field of Search .............. 92/249, 243, 246, 192

[56] References Cited
UNITED STATES PATENTS
3,205,787  9/1965  Volkmann ..................... 92/249 X Primary Examiner—Martin P. Schwadron
Assistant Examiner—Abraham Hershkovitz
Attorney, Agent, or Firm—Mann, Brown, McWilliams & Bradway

[57] ABSTRACT

A ringless piston in which a sealing flange at one or both ends of the piston has a thickness such that it expands under working pressure and in accordance with bursting tendencies of the flange. The piston and flange in the absence of pressure within the cylinder have a normal running clearance with the cylinder wall.

4 Claims, 3 Drawing Figures

PATENTED SEP 2 1975　　3,902,405

LOWER PRESSURE　　HIGHER PRESSURE

RINGLESS PISTON

This application is a continuation-in-part of my copending application Ser. No. 151,268, filed June 9, 1971, now Pat. No. 3,745,890 which in turn is a continuation-in-part of Ser. No. 800,956, filed Feb. 20, 1969, and now abandoned.

The present invention is directed to new and useful improvements in piston and cylinder assemblies of the type used as pumps, engines and other apparatus wherein pressure is developed between the piston and opposed end wall of the cylinder during reciprocation of the piston.

For years it has been more or less customary to use piston rings of various types on the outer walls of the pistons in pressure developing piston and cylinder assemblies. In such cases the piston has a running or working clearance with the opposed wall of the cylinder which may be on the order of one-thousandth of an inch for every inch of piston diameter. In such cases, separate piston rings are carried in grooves on the outer periphery of the piston and are fitted so as to provide some sealing contact with the opposed wall of the cylinder during reciprocation of the piston. In assemblies of this type, the rings wear out and must be replaced and the use of pistons of this type necessitates assembly and machining time to provide the rings for the piston. Various proposals have been made from time to time in the past to form ringless pistons. In some of these cases, pistons are formed with skirt-like flanges on one or both ends of the piston and pressure rings are inserted within the flanges to more or less bend the flanges outwardly so that the extreme end of the flange makes more or less of a line contact with the wall of the cylinder. In other cases, proposals have been made to eliminate the use of rings by forming the piston with a diameter which is at least as great as the inside diameter of the cylinder so as to provide a form of press fit between the piston and cylinder. For some reason or another, these proposals have not gone into widespread use and the ring-type piston construction is still the most widely used construction as of the present time, possibly because of the wear that occurs when a line sealing contact is established by a piston flange and because of the difficulty holding manufacturing tolerances such that a piston can be press-fitted within the cylinder and at the same time provide an operable machine without large frictional losses or excessive costs.

With the foregoing in mind, the primary purposes of the present invention are to create a ringless piston and cylinder construction which, when manufactured, has the normal operating or running clearances or tolerances between the piston and the cylinder and which, when subjected to the normal operating pressure developed within the piston and cylinder, causes an expansion of specially-formed wall surfaces of the piston outwardly into a sealing contact with the wall of the cylinder to provide a relatively large area of wall-to-wall contact while at the same time holding frictional losses developed during reciprocation of the piston to a minimum. A related purpose is to form a piston of the foregoing characteristics in a manner which will seal at low pressures and increase the sealing area at higher pressures. These and other objects of the invention will become more apparent in the course of the ensuing specification and claims when taken with the accompanying drawings, in which:

Like elements are designated by like characters throughout the specification and drawings.

Figure 1:
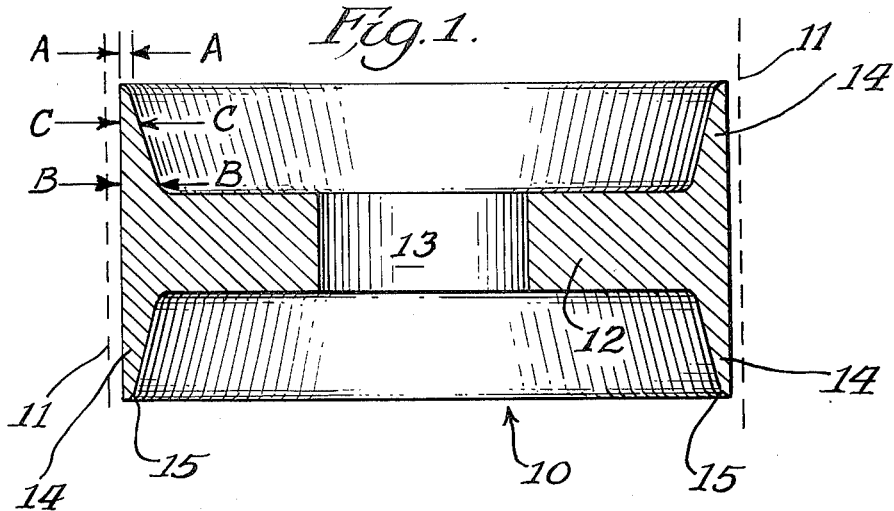
FIG. 1 is a side elevation in section of a typical piston formed in accordance with the principles of the present invention.
Figure 2:
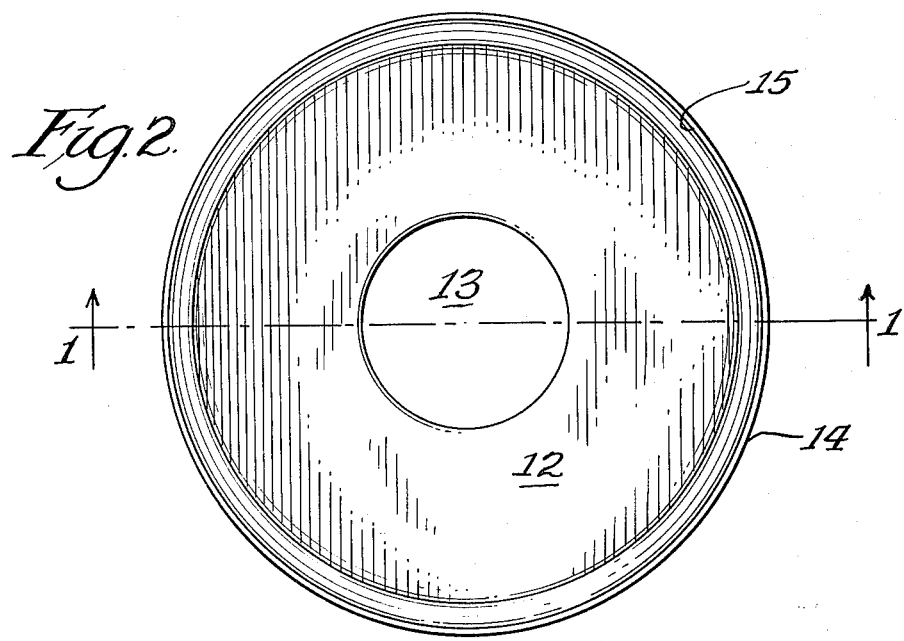
FIG. 2 is an end view of the piston illustrated in FIG. 1.

With specific reference now to the drawings, and in the first instance to FIG. 1, the numeral 10 generally represents a piston formed in accordance with the present invention. The piston is mounted for reciprocation in a cylinder which is diagrammatically represented by the broken lines 11 in FIG. 1. Cylinder 11 may take any one of a number of known forms. The piston and cylinder assembly thus defined may be used in a pump, an hydraulic or air cylinder, a shock absorber or accumulator.

The main portion 12 of the piston may, if used as a part of an hydraulic ram assembly, be provided with a central opening 13 for reception of an operating piston rod or ram in a manner known to the art. On the other hand, the central opening 13 may be omitted and suitable facilities may be provided with the main body portion 12 to enable connection to a connecting rod. Since such piston actuating members and connections are known to the art, and since they form no part of the present invention, they are not illustrated in the drawings.

In accordance with the invention, one or both ends of the piston body is formed with a skirt-like flange 14. As illustrated in the drawings, a flange 14 is provided on opposite sides of the main body of the piston. In situations where only one side of the piston is subjected to pressure, only one flange need be provided, and on the side opposed to the pressurized space within the cylinder.

The piston is preferably formed from a relatively rigid although flexible plastic material. The piston may, for example, be formed from a polyurethane plastic known as Gallagher Compound 1575. This plastic material has a tensile strength of 11,000 pounds per square inch. Equivalent plastic materials may be utilized to perform in accordance with the principles of the invention. The piston may be formed by machining a cylindrical plastic body in accordance with the dimensional relationships hereinafter set forth. It also may be formed by plastic molding techniques.

The cylindrical piston wall in the unexpanded or unpressurized condition of the piston is such as to provide a normal running clearance with the cylinder 11. This normal running clearance may be approximately 0.001 inch for each inch of piston diameter. The diameter of the external cylindrical wall of the piston, including the flange or flanges in the unpressurized condition thereof, is uniform from one end to the other.

Flanges 14 are formed with a tapered thickness which increases from the extreme outer ends of the flanges to the section of the flanges forming a juncture with the main body 12. The extreme ends of the flanges may be rounded or chamfered as at 15.

Figure 3:
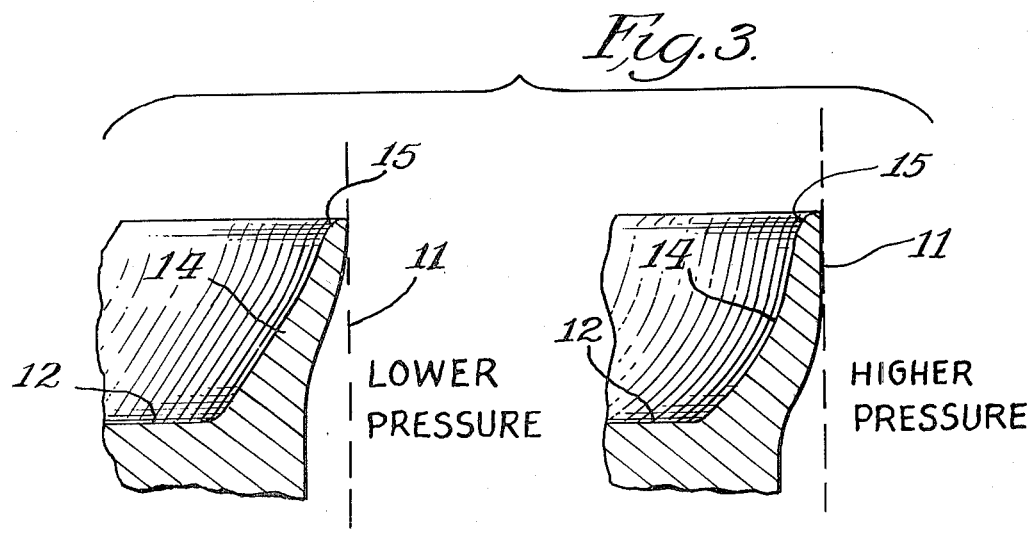
FIG. 3 is an exaggerated diagrammatic illustration of expansion of piston flanges formed in accordance with the invention at low and higher pressures within a cylinder in which a piston is mounted.

The flanges 14 are formed so as to expand in more or less barrel-like fashion. The thickness of the flanges is calculated so that the outermost region thereof may expand outwardly at low pressures as is illustrated in exaggerated and diagrammatic fashion in FIG. 3. As the pressure within the cylinder is increased, a greater portion of the outer circumferential wall of the flanges is expanded outwardly to come into wiping and sealing contact with the cylinder wall as is indicated in the higher pressure diagram in FIG. 3. Thus, an increasing amount of sealing area is made as pressures are increased. This has the distinct advantage of large and effective sealing areas at the extremely high pressure operating conditions.

The width of the flanges 14 necessary to provide the criteria of increasing sealability with increasing pressures is calculated at several points in the length of the flanges. These may be calculated for example as those existing at the extreme outer ends of the flanges as indicated by dimension line A, the dimension line B near the juncture of the flanges 14 with the main body 12, and, at the dimension line C which may be, for example a dimension at an intermediate point in the length of the flanges.

For calculation of the flanges thickness, working pressures with the piston are first calculated. For example, with a reciprocable piston having 4.025 inches external diameter for use with a cylinder having a bore of 4.03 inches, a running clearance of 0.005 inch is sufficient. The cross-sectional clearance area between such a piston and cylinder may be calculated as 0.033 square inches. The pressure within the pressurized space of the cylinder may then be calculated or approximated. For example, if the pressure is supplied by a hydraulic pump supplying a volume of oil at 40 gallons per minute, the pressure in the pressurized space may be calculated by the formula:

Gallons per minute = 24.12 × the leakage area between the piston in square inches × the square root of the final pressure in the pressurized space. with the assumed figures, the formula then becomes:

40 = 24.12 × 0.033 × √Final Pressure (sq. root)

This final pressure may be calculated as 2,525 psi in the pressurized space of the cylinder. The actual working pressure within the cylinder may vary considerably between a low pressure such as 50 psi and a pressure below the calculated final pressure.

If one desires that the flanges expand at their outermost ends at a low pressure and into sealing contact with the cylinder wall, such as at 341 psi, the thickness of the flanges at the outermost ends may then be calculated. Barlow's formula, which is:

Pressure = 2 × wall thickness in inches × the tensile strength of the material divided by the diameter of the cylinder,
is then used.

By substituting values then, 341 psi = 2 × the wall thickness × 11,000 divided by 4.025 (external diameter of the cylindrical section of the piston). The wall thickness at the extreme outer ends (dimension A) of the flanges is then 0.0625 inch.

The same formula may then be utilized to calculate wall thicknesses desired at other points in the length of the flange as, for example, at the dimension C and at the section at the dimension B at the juncture of the flange with the main piston body 12. For example, dimension B may be calculated to seal at 1,375 psi with a thickness of 0.25 inch, while dimension C may be calculated to seal at 678 psi with a thickness of 0.125 inch.

Utilizing this criteria, the wall thickness at each point is that of a cylinder which would expand and burst at different pressures if it is not in some way supported. Such support is provided by the cylindrical wall of the cylinder in which the piston is mounted.

The wall thickness selected for the flange is such that the expansive forces caused by the working pressure within the piston are nonetheless within the elastic limits of the material used. Thus, when pressure is removed, the flanges may recede from their expanded condition toward the unpressurized condition providing a normal running clearance with the cylinder wall.

In the foregoing, temperature effects are neglected for the dual reasons that temperature affects both the piston and the cylinder and because it is not intended that the invention be used with the extreme high operating temperatures as are found in cylinders of internal combustion engines.

Use of a normal running clearance between the piston and the cylinder wall provides simplicities and economies in the assembly of pistons in cylinders.

I claim:

1. A piston and cylinder assembly of the type wherein a piston is reciprocally mounted within a cylinder to produce variant pressure conditions on opposite sides of the piston during reciprocation thereof, the improvement comprising a cylinder and a piston reciprocally mounted therein, to develop a pressurized space in said cylinder, said piston having an outside wall surface providing a normal running clearance with the opposed wall of said cylinder, said piston having an extended skirt-like flange on the end thereof opposed to a closed end of the cylinder, the normal outside diameter of said skirt-like flange being such as to provide said normal running clearance with the opposed wall of the cylinder when the piston is positioned within the cylinder in an unpressurized condition, said piston being formed from a relatively rigid plastic material, said flange having a tapered form with a minimum wall thickness at the outer end of the flange and a maximum wall thickness at the juncture of the flange with the piston body, the thickness and axial length of the flange being such, with relation to the unexpanded outside diameter of the piston, with relation to the particular material of the piston, and with relation to the varying operating pressures developed within the cylinder against the end of the piston carrying said flange, that said flange is expanded outwardly because of hooplike bursting stresses developed therein at the outermost end of the flange at low operating pressures and into wiping and sealing contact with the opposed wall of the cylinder during reciprocation of said piston, the tapered thickness of the flange being such that increasing areas of the outer wall of the flange are moved into contact with the cylinder wall with increasing pressures within the cylinder, the wall thickness of the flange being such that the stresses developed on said flange are within the elastic limits of the material thereof, whereby the flange resiliently recedes towards its original condition after removal of said pressurized condition.

2. The structure of claim 1 wherein said piston has a similarly formed flange on each end thereof.

3. The structure of claim 1 wherein the wall thickness of said flange at the outer end thereof is calculated to be that wall thickness which will expand and burst at said low pressure condition unless the flange is supported.

4. The structure of claim 1 wherein said piston and flange are unitarily formed with a substantially uniform external diameter in the unpressurized condition of the cylinder.

* * * * *